United States Patent [19]

Ono et al.

[11] Patent Number: 5,521,763

[45] Date of Patent: May 28, 1996

[54] OPTICAL DEVICE

[75] Inventors: Satoru Ono; Hiromu Nakamura; Jun Kohsaka, all of Toyokawa, Japan

[73] Assignee: Minolta Camera Kabushiki Kaisha, Osaka, Japan

[21] Appl. No.: 396,876

[22] Filed: Mar. 1, 1995

Related U.S. Application Data

[63] Continuation of Ser. No. 918,459, Jul. 22, 1992, abandoned.

[30] Foreign Application Priority Data

Jul. 26, 1991 [JP] Japan ........................... 3-187896

[51] Int. Cl.$^6$ ........................ G02B 7/02; G02B 26/08
[52] U.S. Cl. .................... 359/819; 359/218; 359/871
[58] Field of Search .................... 359/196–198, 359/216–218, 808–830, 896, 871, 213, 203, 206, 879, 711, 876; 346/1.1, 108, 160

[56] References Cited

U.S. PATENT DOCUMENTS

| 4,632,501 | 12/1986 | Glynn | 359/213 |
|---|---|---|---|
| 4,766,583 | 8/1988 | Oinoue et al. | 359/824 |
| 4,958,907 | 9/1990 | Davis | 359/809 |
| 4,993,809 | 2/1991 | Leib et al. | 359/896 |
| 5,177,644 | 1/1993 | Stark | 359/896 |
| 5,301,060 | 4/1994 | Niikawa et al. | 359/218 |

FOREIGN PATENT DOCUMENTS

| 194415 | 8/1986 | Japan | 359/217 |
|---|---|---|---|
| 47010 | 2/1987 | Japan | 359/218 |
| 50714 | 3/1987 | Japan | 359/218 |
| 62-173707 | 11/1987 | Japan . | |
| 63-157116 | 6/1988 | Japan . | |
| 63-50650 | 12/1988 | Japan . | |
| 164913 | 6/1989 | Japan | 359/217 |
| 2-58016 | 2/1990 | Japan . | |
| 282715 | 11/1990 | Japan | 359/218 |
| 171112 | 7/1991 | Japan | 359/198 |
| 171110 | 7/1991 | Japan | 359/218 |

*Primary Examiner*—Thong Q. Nguyen
*Attorney, Agent, or Firm*—Willian Brinks Hofer Gilson & Lione

[57] ABSTRACT

An optical device having an optical element, a base plate which has a mount surface for setting the optical element, a first holding member composed of at least a hole and a projection so as to permit the optical element mounted on the base plate to move longitudinally and a second holding member composed of a hole and a projection so as to restrain the optical element from moving in a direction orthogonal to an optical axis.

16 Claims, 6 Drawing Sheets

OPTICAL DEVICE

This application is a continuation of application Ser. No. 07/918,459, filed Jul. 22, 1992, now abandoned.

BACKGROUND OF THE INVENTION

1. Field of the Invention

The present invention relates to optical devices, and more particularly to a laser beam scanning optical device for deflecting a laser beam, as modulated in accordance with image data, by deflecting means to cause the beam to scan a photosensitive member to form images thereon.

2. Description of the Related Art

Various optical elements, such as fΘ lenses and reflecting mirrors, which are made of resin have been developed in recent years for use in the laser beam scanning optical device to be incorporated into laser printers, facsimile systems, copying machines and the like for image writing because optical elements of resin can be produced in quantities with a specified quality.

However, resin optical elements are prone to deformation or distortion due to variations in the ambient conditions (temperature and humidity) and therefore have the problem that the image forming position of the beam alters with respect to the main scanning direction and subscanning direction. Various structures of simple construction have already been proposed for accurately fixing resin optical elements in position within optical devices. For example, Japanese Laid-Open Patent Application No. 63-157116 discloses an optical device wherein an optical element of resin is positioned in place at its opposite ends with a force parallel to the optical axis and has it central portion placed in position longitudinally and transversely of the device. The conventional structures nevertheless require a large number of components or are unsatisfactory in distortion correcting effect, and still remain to be improved.

SUMMARY OF THE INVENTION

An object of the present invention is to provide an optical device adapted to attach an optical element to a support by a simple structure.

Another object of the invention is to provide an optical device adapted to exhibit stabilized optical performance even if an optical element incorporated therein deforms owing to ambient conditions.

These objects of the present invention are fulfilled by an optical device which comprises a base plate including a mount surface for mounting an optical element on the base plate, the optical element having a contact surface to be pressed into contact with the mount surface of the base plate, first holding means for holding the optical element so as to permit the optical element to move longitudinally thereof, and second holding means for holding the optical element so as to restrain the optical element from moving in a direction orthogonal to an optical axis.

These and other objects, advantages and feature of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Laser beam scanning optical devices embodying the present invention will be described below.

Figure 1:
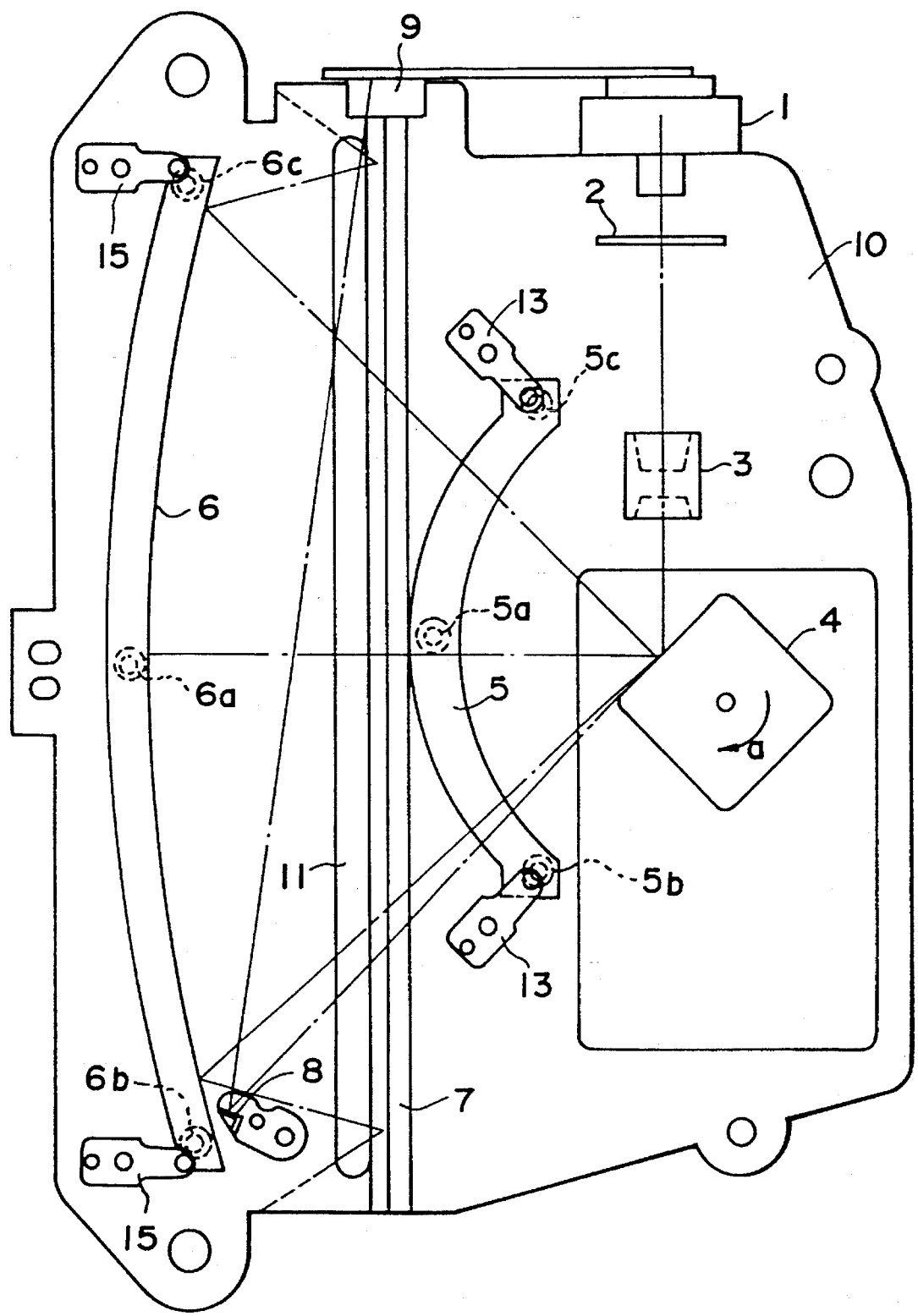
FIG. 1 is a plan view showing the interior construction of a first embodiment of the invention, i.e., a laser beam scanning optical device.
Figure 2:
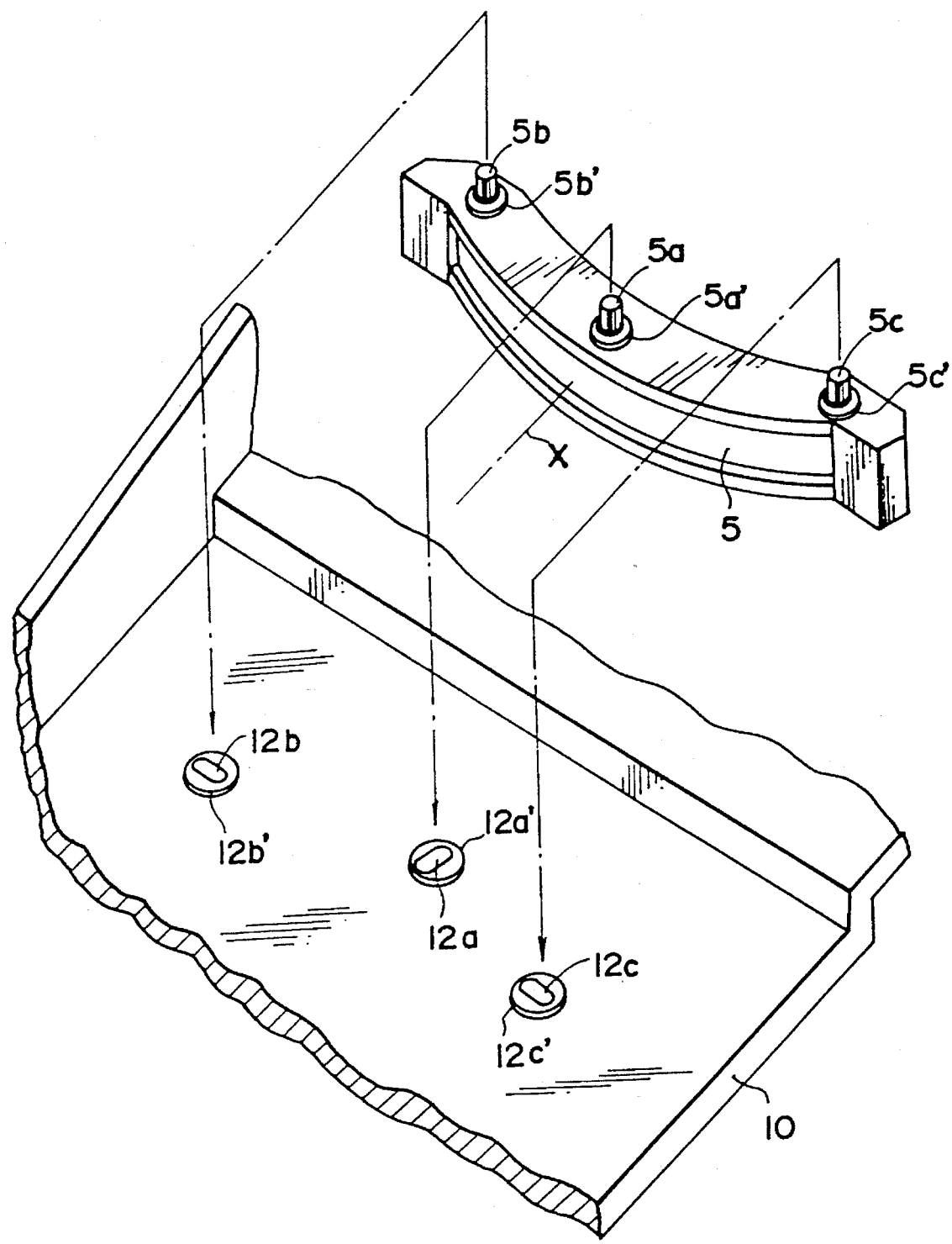
FIG. 2 is a perspective view showing a mount structure for a toroidal lens shown in FIG. 1.
Figure 3:
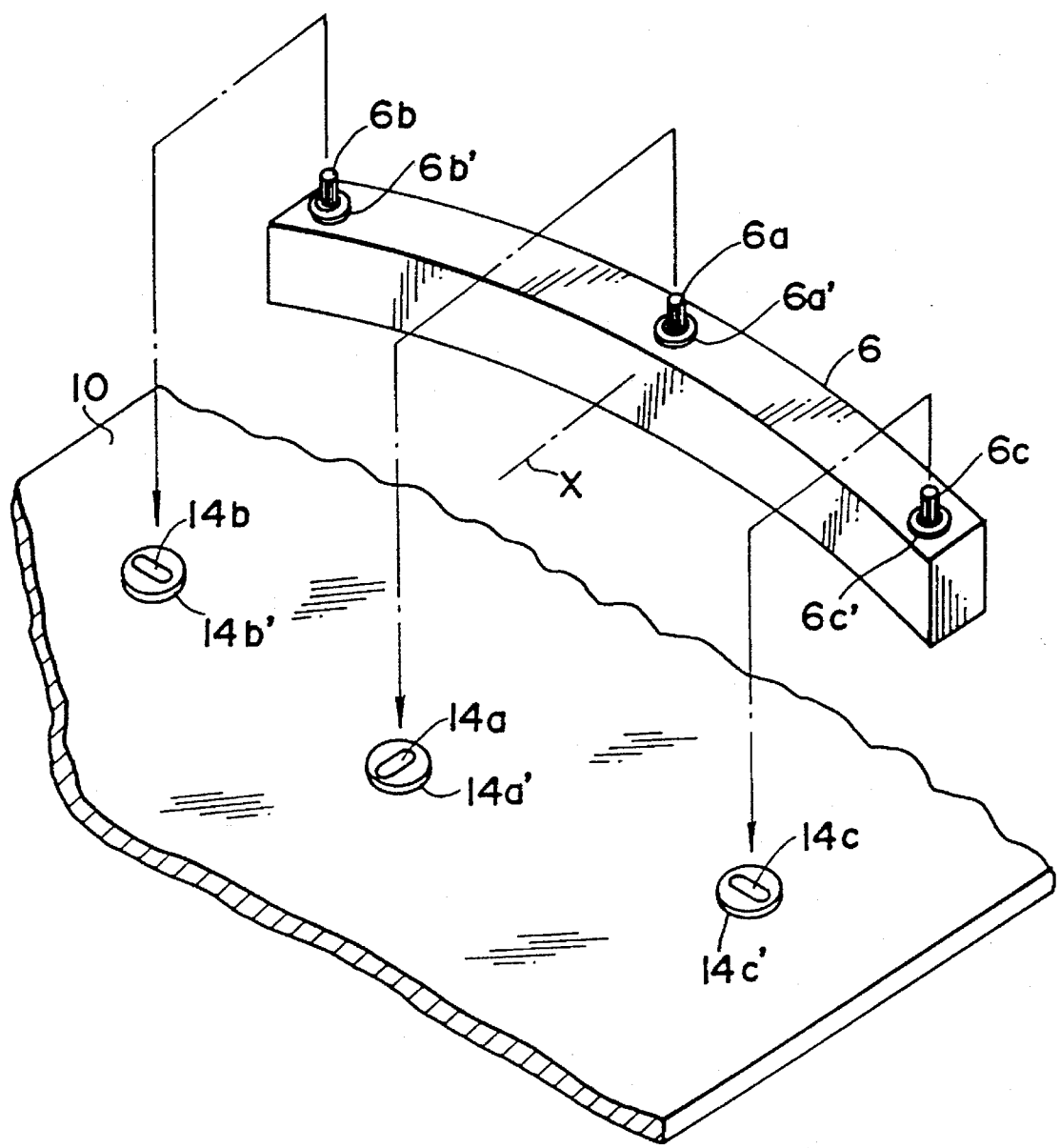
FIG. 3 is a perspective view showing a mount structure for a spherical mirror shown in FIG. 1.

FIGS. 1, 2 and 3 show a first embodiment.

With reference to FIG. 1, the laser beam scanning optical device comprises a light source unit 1 having a laser diode and a collimator lens incorporated therein, beam shaping slit plate 2, cylindrical lens 3, polygonal mirror 4, toroidal lens 5, spherical mirror 6, plane mirror 7, SOS sensor 9 for detecting an image writing position, and mirror 8 for guiding a laser beam to the sensor 9. These components are mounted on a base plate 10 and covered with an unillustrated cover.

The laser diode is (on-off) controlled for modulation based on image data fed to an unillustrated control unit, and when it is on, a laser beam is emitted by the light source unit 1. The laser beam is formed by the collimator lens into a bundle of convergent rays concentrating at a rearward definite position, and is thereafter changed by the cylindrical lens 3 in its spot form to a substantially linear shape the lengthwise direction of which is parallel to the main scanning direction, whereupon the beam reaches the polygonal mirror 4. The polygonal mirror 4 is drivingly rotated in the direction of arrow a at a constant speed, whereby the laser beam is deflected at a constant angular velocity within a plane perpendicular to the axis of rotation of the mirror 4 and guided to the toroidal lens 5. The toroidal lens 5 is provided with a surface of incidence and a surface of emergence which are concentric in scanning section, and has a definite power in a direction perpendicular to the plane of deflection. The combination of the toroidal lens 5 and the cylindrical lens 3 corrects the inclination of deflecting plane of the polygonal mirror 4. The laser beam is further reflected at the spherical mirror 6. The reflected beam is reflected downward at the plane mirror 7, passes through a slit 11 provided in the bottom of the base plate 10 and forms images on an unillustrated photosensitive drum. The formation of images on the drum is accomplished by the main scanning movement of the laser beam due to the rotation of the polygonal mirror 4 in the direction of arrow a and the subscanning movement of the beam due to the rotation of the photosensitive drum. The spherical mirror 6 has an fΘ function (distortion correcting function) for correcting the main scanning speed of the laser beam and also a function of correcting curvature of field on the photosensitive drum.

The toroidal lens 5 and the spherical mirror 6 are each integrally molded of a resin material (such as polycarbonate or acrylic resin). The Structures for mounting these components in place will be described below.

With reference to FIG. 2, the toroidal lens 5 is provided on its bottom surface with a projection 5a at the lengthwise midportion thereof and projections 5b, 5c at its opposite ends. On the other hand, the base plate 10 is formed with holes 12a, 12b, 12c for inserting the projections 5a, 5b, 5c thereinto respectively. The projections 5a, 5b, 5c and the holes 12a, 12b, 12c are provided with seats 5a', 5b', 5c', 12a', 12b', 12c', respectively. These seats serve to accurately position the toroidal lens 5 at a specified level when the lens 5 is mounted on the base plate 10.

The central hole 12a is an elongated hole extending in a direction parallel to the optical axis X for the inserted projection 5a to fit to the hole portion only with respect to a direction orthogonal to the optical axis X. The end holes 12b, 12c are each in the form of an elongated hole extending in a direction orthogonal to the optical axis X, so that the inserted projections 5b, 5c fit to the respective hole portions only with respect to a direction in parallel to the optical axis X. Thus, when the projections 5a, 5b, 5c are forced into the respective holes 12a, 12b, 12c, the toroidal lens 5 is positioned in place with respect to the direction orthogonal to the optical axis X by the engagement of the projection 5a in the hole 12a, and is positioned in place with respect to the direction in parallel to the optical axis X by the engagement of the projections 5b, 5c in the respective holes 12b, 12c.

The projection 5a is fixed in the hole 12a with an adhesive, and each end of the toroidal lens 5 is elastically held in position from above by a plate spring 13 (see FIG. 1).

With the arrangement described above, the toroidal lens 5 made of resin is susceptible to deformation, especially to longitudinal expansion or shrinkage, due to variations in ambient conditions. The midportion of the toroidal lens 5 is restrained in position with respect to the direction orthogonal to the optical axis X by the engagement of the projection 5a in the hole 12a and adhesion, while at the opposite ends of the lens 5, the protections 5b, 5c are movable relative to the holes 12b, 12c in the direction orthogonal to the optical axis X. Accordingly, deformation of the toroidal lens 5 is absorbed by the projections 5b, 5c slightly moving within the holes 12b, 12c. This obviates the likelihood that the distortion of the toroidal lens 5 will impair its optical performance, Incidentally, the hole 12a in the midportion is elongated in the direction parallel to the optical axis X to make the projection 5a easily insertable thereinto.

FIG. 3 shows a structure for mounting the spherical mirror 6 on the base plate 10. The relation between projections 6a, 6b, 6c on the spherical mirror 6 and holes 14a, 14b, 14c formed in the base plate 10 is the same as the relation between the projections on the toroidal lens 5 and the corresponding holes. The spherical mirror 6 is fixedly mounted on the base plate 10 by inserting the projections 6a, 6b, 6c into the respective holes 14a, 14b, 14c, fixing the projection 6a in the hole 14a with an adhesive and causing a plate spring 15 (see FIG. 1) to press each end of the mirror 6 against the base plate 10. The deformation of the spherical mirror 6 to be caused by variations in the ambient conditions is absorbed in the same manner as in the case of the toroidal lens 5 by the movement of the projections 6b, 6c in the respective holes 14b, 14c in a direction orthogonal to the optical axis X. Seats 6a', 6b', 6c', 14a', 14b', 14c' are provided for positioning the spherical mirror 6 at a specified level.

Especially with reflecting optical elements like the spherical mirror 6, the distortion of the reflecting surface produces approximately twice as great an adverse influence as is the case with transmission optical elements like the toroidal lens 5. Accordingly, the foregoing mount structure which will not permit distortion of the optical element is effective for the spherical mirror 6 and like reflecting optical elements. Moreover, the structure eliminates the likelihood that the spherical mirror 6 will rise off the base plate 10 because the deformation of the mirror 6 is absorbed at its opposite end portions and further because the mirror midportion is fixed to the plate 10 by the adhesion of the projection 6a to the hole portion 14a. If the midportion of the spherical mirror 6 rises off the base plate, the scan line on the photosensitive member will be bent, whereas the present embodiment is free of such a drawback.

Figure 4:
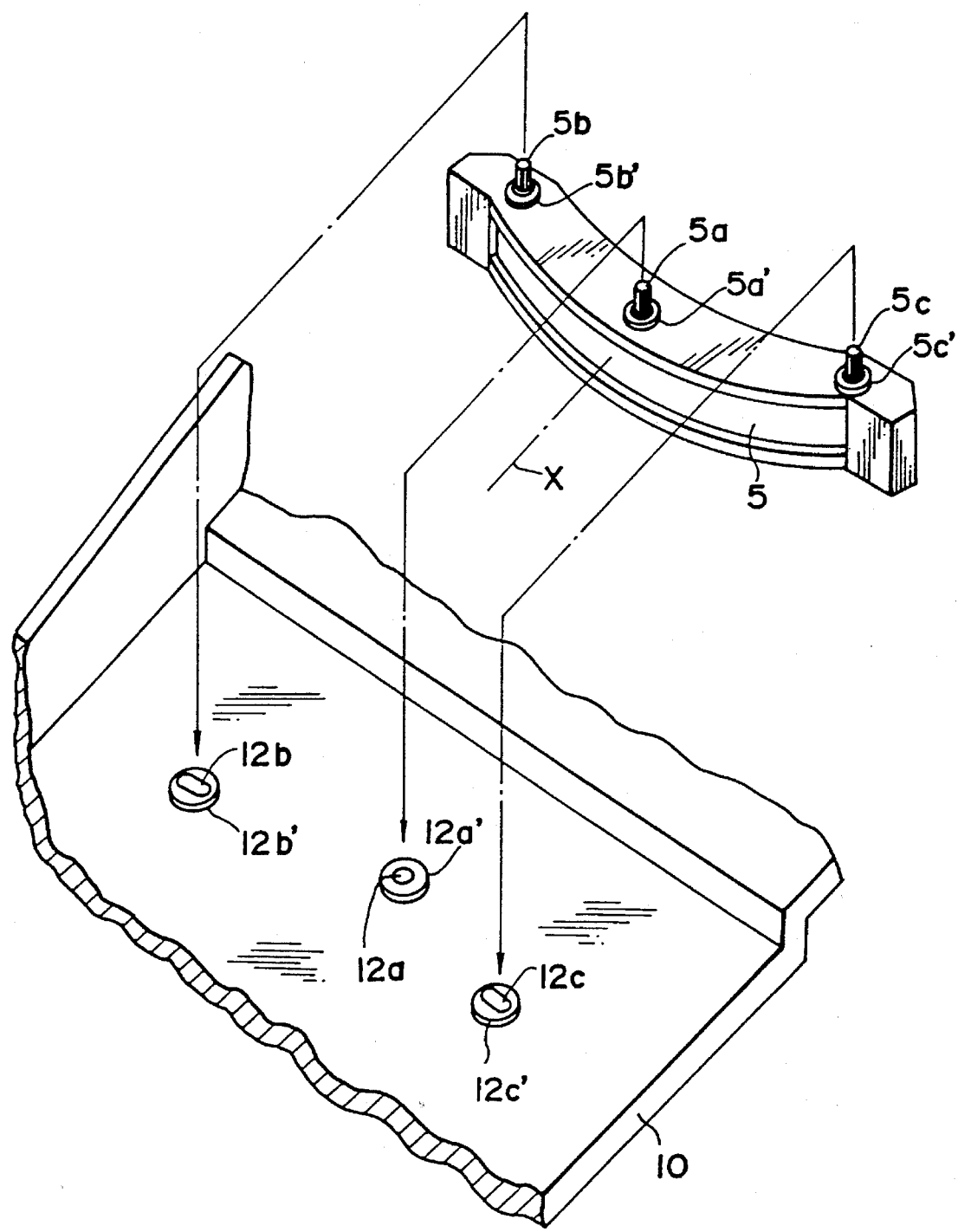
FIG. 4 is a perspective view showing a mount structure for a toroidal lens in a second embodiment.

FIG. 4 shows a second embodiment.

The second embodiment has the same construction as the embodiment of FIG. 2 except that the midportion projection 5a on a toroidal lens 5 is fittable into a hole 12a which is circular. This embodiment is similar to the first in operation and advantage. In addition, the projection 5a is restrained in position with respect to any of directions in parallel to the optical axis X and orthogonal thereto. The midportion is therefore positionable in place more reliably.

Figure 5:
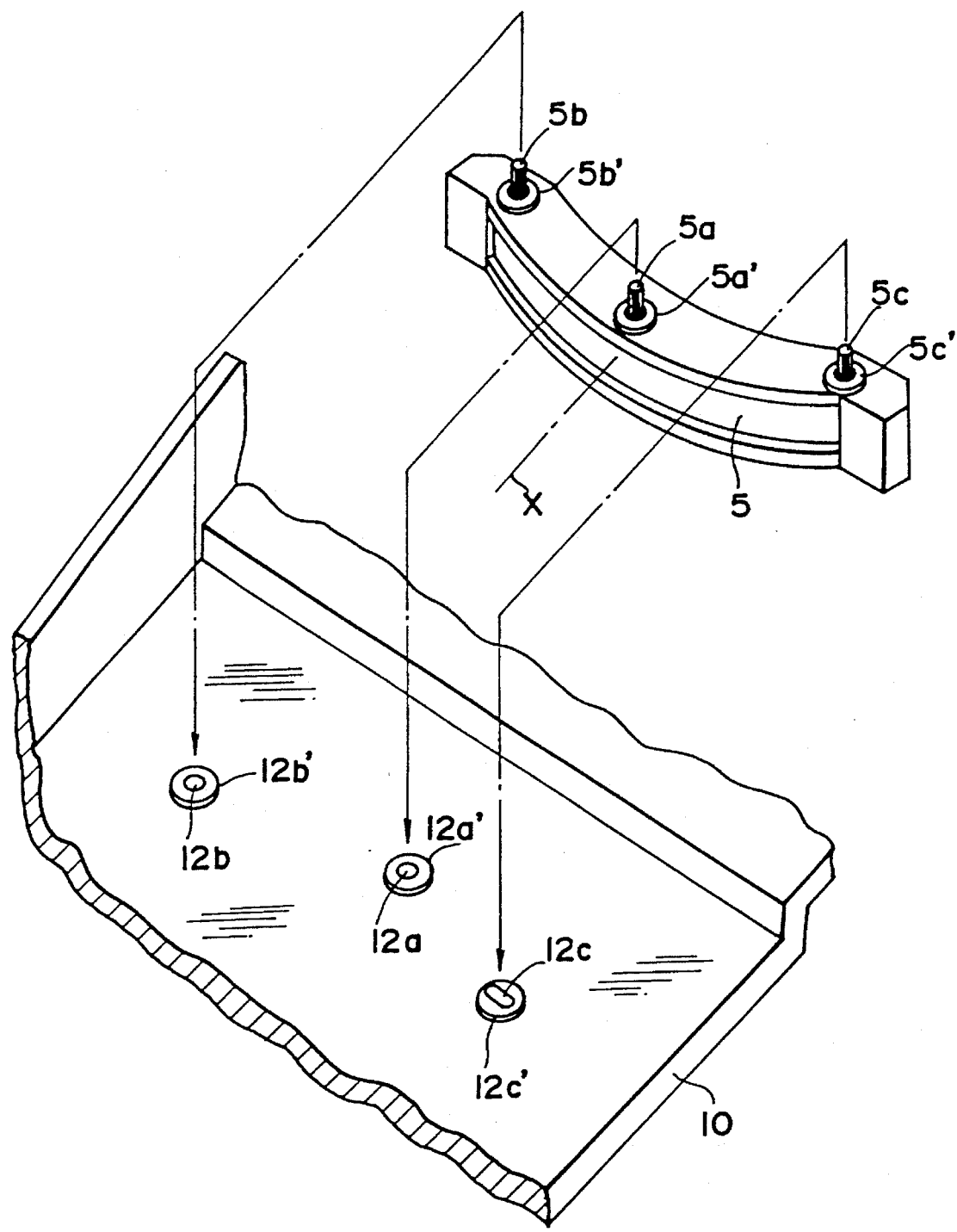
FIG. 5 is a perspective view showing a mount structure for a toroidal lens in a third embodiment.

FIG. 5 shows a third embodiment.

With this third embodiment, the midportion projection 5a on a toroidal lens 5 is fittingly inserted into a hole 12a which is circular, and the hole 12b for the end projection 5b to be inserted thereinto is a circular hole having a slightly larger diameter than the projection 5b. The hole 12c for receiving the other end projection 5c therein is an elongaged hole in which the projection 5c is fittable only with respect to a direction parallel to the optical axis X as in the first and second embodiments described.

According to the third embodiment, the toroidal lens 5 is positioned in place on the base plate 10 by fitting the projection 5a into the hole 12a and inserting the projection 5c into the hole 12c to thereby fit the projection 5c to the hole portion 12c with respect to the direction parallel to the optical axis X. The hole 12b is given a larger diameter than the projection 5b to make the toroidal lens 5 fixedly mountable on the base plate 10 without trouble even if the position where the projection 5b or the hole 12b is formed involves a slight error. The hole 12b absorbs the deformation of the end portion of the toroidal lens 5 with respect to any direction.

Figure 6:
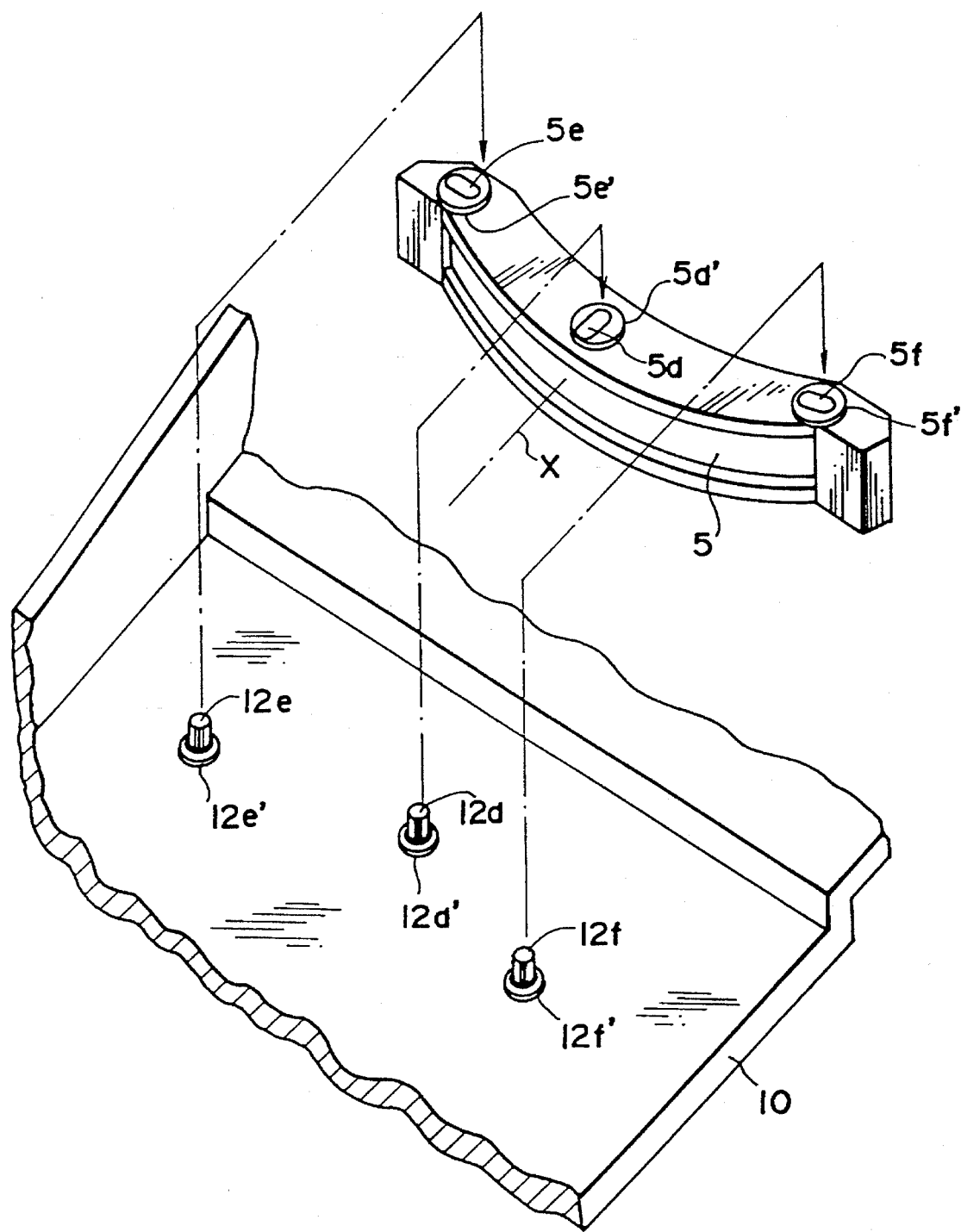
FIG. 6 is a perspective view showing a mount structure for a torodial lens in a fourth embodiment.

FIG. 6 shows a fourth embodiment.

With this fourth embodiment, a toroidal lens 5 is formed with holes 5d, 5e, 5f like those of the first embodiment, and a base plate 10 is provided with projections 12d, 12e, 12f as positioned in corresponding relation with the respective holes 5d, 5e, 5f. Seat 5d', 5e', 5f', 12d', 12e', 12f are provided for positioning the toroidal lens 5 at specified level. This embodiment has same construction as the first with the exception of the above feature.

Other Embodiments

The laser beam scanning optical device of the present invention is not limited to the foregoing embodiments but can be modified variously within the scope of the invention.

For example, the mount structure shown in FIGS. 4, 5 and 6 are applicable not only to the toroidal lens 5 but also to the spherical mirror 6. These mount structures and those shown in FIGS. 2 and 3 are further applicable to plane mirrors and other elongated optical elements.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical device comprising:

a base including a mount surface having seats thereon;

an optical element having contact surfaces to be pressed into contact with the seats of said base at its first and second end portions, said optical element including a midportion between said first and second end portions, an optical axis of said optical element extending from said midportion; and holding means for holding said optical element to said base, said holding means including:

first holding means for holding said midportion of said optical element to said base so as to restrain said midportion and said optical axis extending therefrom from moving in a first direction orthogonal to said optical axis;

second holding means for holding at least one of said first and second end portions of said optical element to said base, while said midportion is restrained by said first holding means, so as to permit said at least one of said first and second end portions of said optical element to move in said first direction; and third holding means for holding said first and second end portions of said optical element to said seats by a plate spring having a force to press said optical element on said seats.

2. An optical device as defined in claim 1, wherein each of said first and second holding means is composed of a hole and a projection, said hole being provided on either one of said base and said optical element and said projection being provided on the other one.

3. An optical device as defined in claim 2, wherein said hole of said second holding means comprises an elongated opening extending in said first direction.

4. An optical device as defined in claim 3, wherein said optical element is a lens made of a resin material.

5. An optical device as defined in claim 3, wherein said optical element is a spherical mirror made of a resin material.

6. An optical device as defined claim 2, wherein said second holding means holds each of said first and second end portions of said optical element so as to permit said first and second end portions to move in said first direction.

7. An optical device as defined in claim 2, wherein said hole of said first holding means is an opening sized to restrain said midportion of said optical element from moving in said first direction and in a second direction orthogonal to said first direction.

8. An optical device as defined in claim 7, wherein said optical element is a lens made of a resin material.

9. An optical device as defined in claim 7, wherein said optical element is a spherical mirror made of a resin material.

10. An optical device comprising:

a base plate which has a surface having seats;

an optical element brought into pressing contact with said seats at its end portions, said optical element being elongated in a longitudinal direction of said optical element, said base plate having first and second holes for mounting said elongated optical element on said seats, said second hole being an elongated opening extending in a direction orthogonal to said longitudinal direction, said optical element having a first projection and a second projection engageable with said first and second holes, respectively, said second projection being provided substantially at a midportion of said elongated optical element; and a holder which holds the end portions of said optical element to said seats by a plate spring having a force to press said optical element on said seats.

11. An optical device as defined in claim 10, wherein said optical element is a lens made of a resin material.

12. An optical device as defined in claims 10, wherein said optical element is a spherical mirror made of a resin material.

13. An optical device comprising:

a base plate which has a surface having seats;

an optical element brought into pressing contact with said seats at its end portions, said optical element being elongated in a longitudinal direction of said optical element, said optical element having first and second holes for mounting said optical element on said seats, said second hole being an elongated opening extending in a direction orthogonal to said longitudinal direction, said base plate having first and second projections engageable with said first and second holes, respectively, said second projection being provided at a position of said base plate corresponding substantially to a midportion of said elongated optical element; and a holder which holds the end portions of said optical element to said seats by a plate spring having a force to press said optical element on said seats.

14. An optical device as defined in claim 13, wherein said optical element is a lens made of a resin material.

15. An optical device as defined in claim 13, wherein said optical element is a spherical mirror made of a resin material.

16. An optical device comprising:

a base plate including a mount surface having seats;

an optical element having a contact surface to be pressed into contact with the seats of said base plate at its end portions;

first holding means for holding said optical element onto said seats of said base plate by at least three points so as to prevent said optical element from moving in a first direction at one of said at least three points, and, at the same time, to permit said optical element to move in said first direction at two others of said at least three points, said one point being between said two other points; and second holding means for holding the end portions of said optical element to said seats by a plate spring having a force to press said optical element on said seats.

* * * * *